United States Patent
Plaindoux et al.

(10) Patent No.: US 9,556,370 B2
(45) Date of Patent: Jan. 31, 2017

(54) OPTIMIZED HEAT-PROTECTION MATERIAL

(75) Inventors: Cédric Plaindoux, Bourdeaux (FR); Jean-Marc Bouilly, Saint Medard en Jalles (FR)

(73) Assignee: ASTRIUM SAS (FR)

( * ) Notice: Subject to any disclaimer, the term of this patent is extended or adjusted under 35 U.S.C. 154(b) by 241 days.

(21) Appl. No.: 13/642,826

(22) PCT Filed: Apr. 19, 2011

(86) PCT No.: PCT/EP2011/056269
§ 371 (c)(1),
(2), (4) Date: Mar. 1, 2013

(87) PCT Pub. No.: WO2011/131692
PCT Pub. Date: Oct. 27, 2011

(65) Prior Publication Data
US 2013/0193366 A1  Aug. 1, 2013

(30) Foreign Application Priority Data

Apr. 22, 2010  (FR) ....................... 10 53086

(51) Int. Cl.
*C09K 3/00* (2006.01)
*B64G 1/58* (2006.01)
*C08K 7/06* (2006.01)
*C08L 63/00* (2006.01)
*C08L 97/00* (2006.01)
*F16L 59/04* (2006.01)

(52) U.S. Cl.
CPC . *C09K 3/00* (2013.01); *B64G 1/58* (2013.01); *C08K 7/06* (2013.01); *C08L 63/00* (2013.01); *C08L 97/007* (2013.01); *F16L 59/04* (2013.01)

(58) Field of Classification Search
CPC ............. B64G 1/58; C08K 7/06; C08L 63/00; C08L 97/007; C08L 61/04; C09K 3/00; F16L 59/04

USPC .......................................................... 524/496
See application file for complete search history.

(56) References Cited

U.S. PATENT DOCUMENTS

| 2,087,942 | A |   | 7/1937  | West            |         |
|-----------|---|---|---------|-----------------|---------|
| 4,031,059 | A |   | 6/1977  | Strauss         |         |
| 4,204,899 | A |   | 5/1980  | Walker et al.   |         |
| 4,595,714 | A | * | 6/1986  | McAllister et al. | 523/179 |
| 4,663,401 | A | * | 5/1987  | Saito et al.    | 525/505 |
| 5,064,868 | A |   | 11/1991 | Simpson et al.  |         |
| 2001/0036505 | A1 |  | 11/2001 | Kirby et al. |     |
| 2004/0241408 | A1 | * | 12/2004 | Garrettson | 428/292.1 |
| 2005/0096414 | A1 |  | 5/2005 | Cosby et al. |      |
| 2006/0188726 | A1 | * | 8/2006 | Muenz et al. | 428/413 |

FOREIGN PATENT DOCUMENTS

| CH | 274859 A       | 4/1951  |
| EP | 1482163 A2     | 12/2004 |
| EP | 1493788 A1     | 1/2005  |
| GB | 846577 A       | 8/1960  |
| GB | 879411 A       | 10/1961 |
| WO | 2004033572 A1  | 4/2004  |

OTHER PUBLICATIONS

International Search Report dated Aug. 17, 2011.
Reculusa et al: "Formation of low-density carbon materials through thermal degradation of a cork-based composite", Carbon, Elsevier, Oxford, GB, vol. 44, No. 7, Jun. 1, 2006 (Jun. 1, 2006), pp. 1316-1320, XP025010899, ISSN: 0008-6223, DOI: DOI:10.1016/J.CARBON2005.12.051 p. 1316, right-hand column, paragraph 2—p. 1320, left-hand column, paragraph 1.

\* cited by examiner

*Primary Examiner* — Alexander Kollias
(74) *Attorney, Agent, or Firm* — Perman & Green, LLP

(57) ABSTRACT

A material for protecting a surface from heat made of a mixture comprising cork granules and resin as a binding agent, which also includes short fibers of heat-resistant material, and phenolic resin or epoxy resin.

11 Claims, 7 Drawing Sheets

OPTIMIZED HEAT-PROTECTION MATERIAL

CROSS-REFERENCE TO RELATED APPLICATIONS

This application is the National Stage of International Application No. PCT/EP2011/056269 International Filing date, 19 Apr. 2011, which designated the United States of America, and which International Application was published under PCT Article 21 (s) as WO Publication 2011/131692 A1 and which claims priority from, and benefit of, French Application No. 1053086 filed on 22 Apr. 2010, the disclosures of which are incorporated herein by reference in their entireties.

The disclosed embodiment concerns heat protection materials of the type used in the field of aerospace. These materials are designed to protect structures or equipment from very high heat loads, during short periods not exceeding a few minutes.

These materials are required during phases of going through the atmosphere of planets, both on launch and reentry.

They are also used as protection against the heat sources of launch or space vehicles, such as the propulsion units.

BACKGROUND

The natural heat insulation properties of cork, associated with a binding agent that resists high temperatures, makes its use possible in aerospace and military industries for such applications.

There are many realizations of heat protection materials; in particular: document US 2001/0036505 A1 concerns a porous composition comprising cork particles and a binding agent; document U.S. Pat. No. 4,204,899 concerns making an ablative heat protection material comprising finely divided cork and thermosetting resin; and document EP 1 493 788A1 describes an ablative heat protection material for entry into the atmosphere of a space vehicle comprising cork and silicone that can be projected onto a surface.

Document US2005/0096414 A1 describes a heat protection material comprising silicone resin, a silicone catalyst, cork, glass ecospheres and a silicone solvent, with 65.3 to 72.3 percent of silicone resin by mass.

One material used is also the material known under the EADS group's brand name NORCOAT.

This material comprises 100 parts by weight of 0.5 to 1 mm cork, 35 parts by weight of phenolic resin, a fungicide and a flame retardant.

SUMMARY

The objective of the disclosed embodiment is to optimize the performance by mass of existing materials used, in regards to high and low flow applications, from 0.1 MW/m2 up to 10 MW/m2, and to obtain markedly less dense materials than the materials currently used in this field.

Intense flows occur on the forward shields of space vehicles or on the rear portions of the vehicles which are subjected to propulsion flows.

Weak flows occur on the rear portions of atmospheric reentry vehicles.

The objective of the disclosed embodiment is to optimize the existing materials' ablative behavior performance by mass. This means optimizing the behavior inside a heat flow of the crust that forms on the material subjected to the heat flow.

To achieve this, the disclosed embodiment provides a material for protecting a surface from heat made of a mixture comprising cork granules and resin as a binding agent, characterized in that it also comprises short fibers of heat-resistant material.

Advantageously, the proportion of short fibers in the material is 12 to 18% by mass and preferably, the proportion of short fibers corresponds to a percentage by mass of 14.5 to 15.5%.

According to a first embodiment, the resin is phenolic resin.

In this case, the percentage of resin by mass is advantageously between 20 and 30% and preferably 25.9%±2%.

According to an aspect of the disclosed embodiment, the resin is epoxy resin.

The percentage of resin by mass in the epoxy resin is then advantageously between 20 and 35% and preferably 27%±2%.

In particular, the epoxy resin can be a resin with two ingredients.

According to a first variant of the disclosed embodiment, the short fibers are carbon fibers.

According to a second variant, the short fibers are alumina fibers.

BRIEF DESCRIPTION OF THE DRAWINGS

Other features and advantages of the disclosed embodiment will be better understood in reading the following description of non-limiting examples of realization of the disclosed embodiment with drawings, which show.

DETAILED DESCRIPTION

Figure 1:
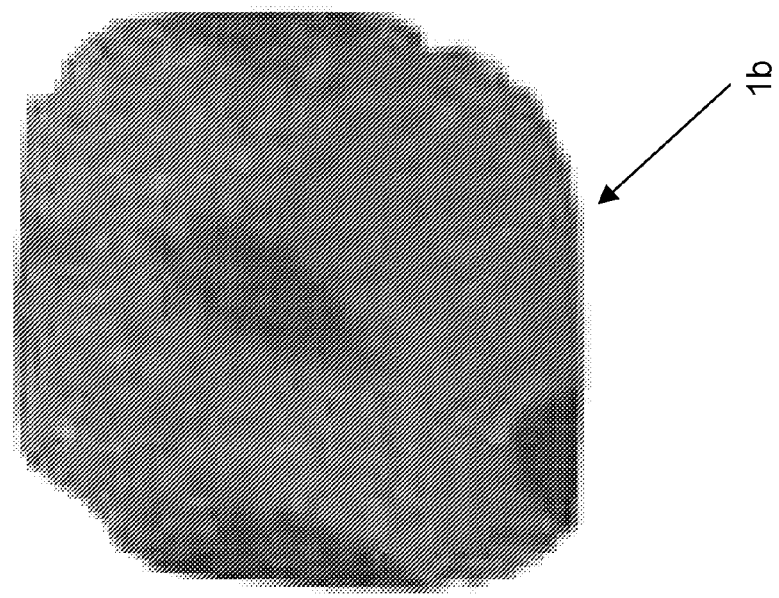
in FIG. 1: a first material of the disclosed embodiment before and after heat testing.
Figure 1:
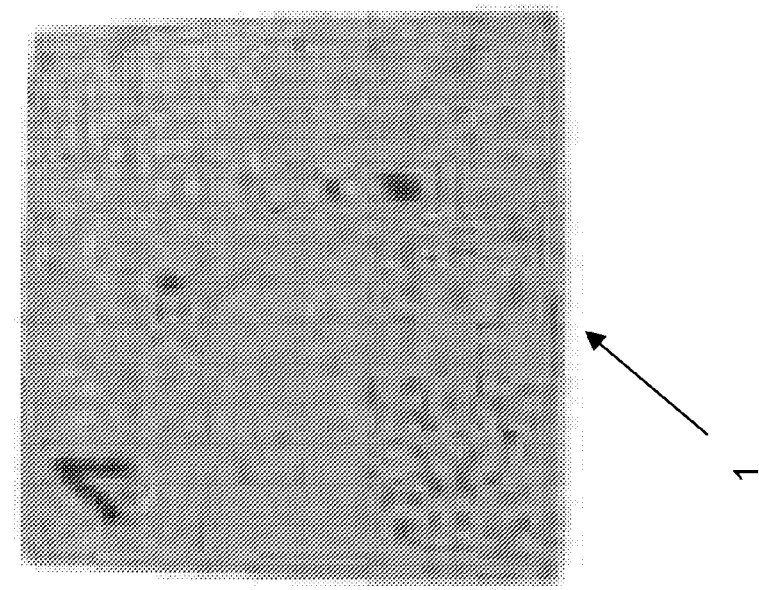

The heat protection materials used in the context of aerospace missions are exposed to large heat load during short periods of time. Materials to be projected onto the surfaces to be protected and sheet materials both exist; the disclosed embodiment concerns the sheet materials.

Because of their operating principle, these materials, particularly those that comprise cork, cannot be characterized according to criteria such as heat conductivity, heat capacity and diffusivity.

In addition, it is not possible to define a temperature to which they will be subjected; however, their conditions of use can be characterized by a law that expresses the heat flow applied as a function of time.

When subjected to a heat flow caused by the friction of an atmosphere, heat protection materials react in transient fashion: they heat up by heat conduction and radiation, transmit the heat with their diffusivity and decompose.

Their surface that is exposed to the flow can also wear away little by little.

This last behavior, called "ablative", is fundamental for this type of materials because it helps to reduce the incoming heat flow.

The behavior of materials during this ablation must be such that the material that decomposes leaves a residue, called "crust", which remains in place at the surface of the material.

This crust must remain in place despite the mechanical loads to which the material may be subjected, in particular vibrations and aerodynamic friction.

In addition, so as not to alter the aerodynamic profile of the object during its atmospheric travel, this crust must be uniform and have the least possible number of cracks.

Lastly, the formation of this crust must occur with the smallest possible reduction in the surface area of the material, to preserve the material's insulating properties.

To optimize the materials and get the appropriate behavior from them, many parameters can be altered, with the aim of obtaining the smallest possible increase in temperature on the cold side of the material at the end of the space vehicle's mission, for the lowest possible protective mass.

One important optimization criterion for heat protection materials is their mass, because optimizing technical solutions in terms of their mass is an ever-present objective when building space vehicles or aircraft.

In effect, any mass gains on the structure allow either a larger payload or a reduction in the mass of propellant to be carried and possibly allow reducing the mass of the support structure.

The effects of reducing the mass are not just technical, they are also financial. It is already very important to reduce the mass of the vehicle on a launcher; it becomes even more so for a space probe that has to return to a planet after a journey in space.

Given a material whose crust remains as uniform as possible, it is possible to envisage reducing the thickness of the protection material, allowing a reduction in the mass of material required.

Missions that require heat protection are characterized in terms of heat flow, of duration of temperature stress and also in terms of heat load, which corresponds to the total flow accumulated in the course of the mission.

The tests performed are pyrolysis tests, performed according to the ISO 5660 standard, with an irradiation of 75 kW/m2 for a duration of 300 seconds.

Such a test makes it possible to approximate adequately the material's behavior in relation to the planned mission.

FIG. 1 shows a first material 1a, 1b of the disclosed embodiment, which comprises a proportion of phenolic resin of 25.9%±2% by mass, as well as a proportion of carbon fibers of 14.8%±2% by mass. The material is shown before 1a and after 1b heat testing. After heat testing, the material has a uniform crust and comprises no cracks.

Figure 2:
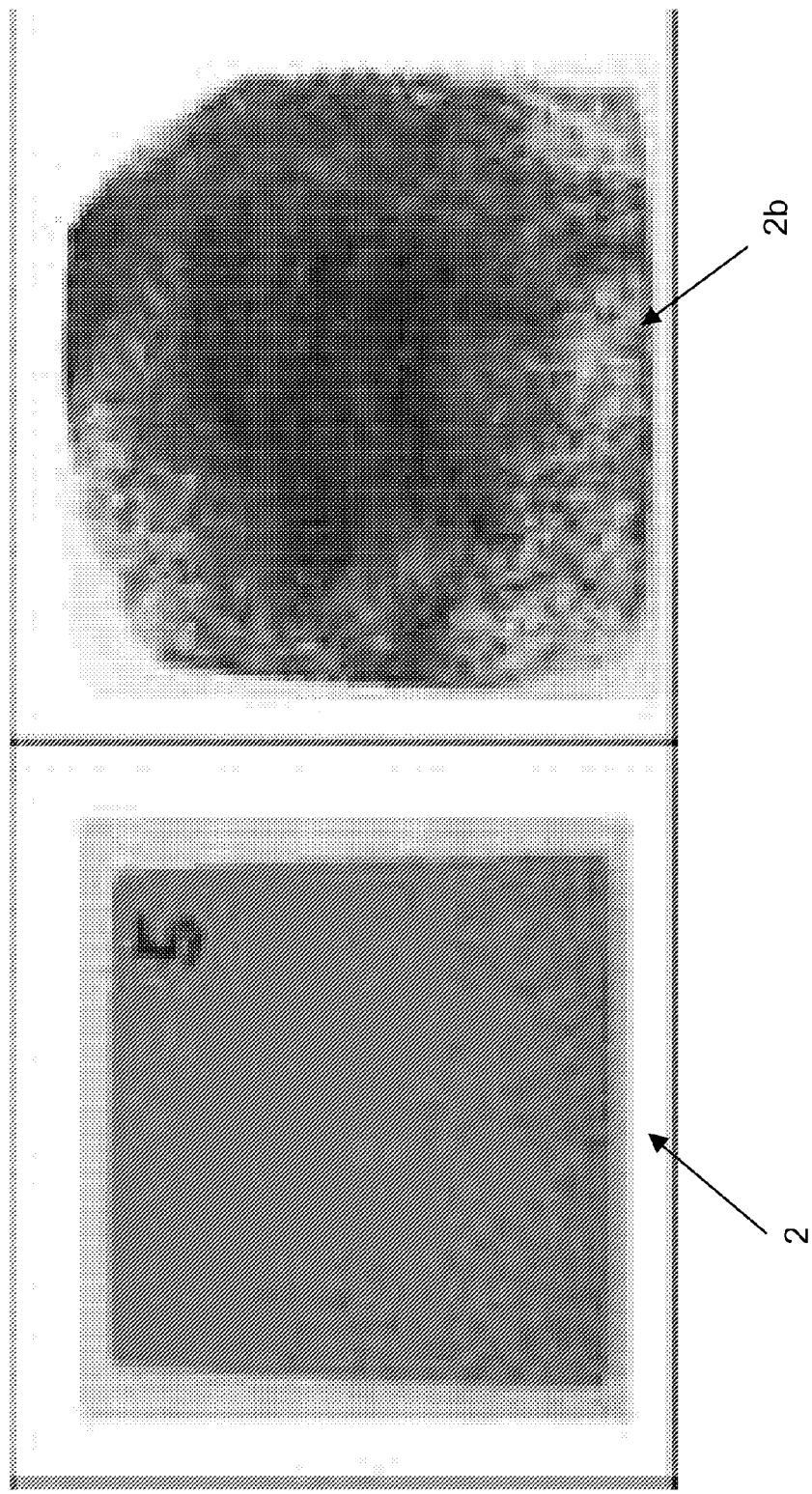
in FIG. 2: a second material of the disclosed embodiment before and after heat testing.

FIG. 2 shows a second material 2a, 2b of the disclosed embodiment, which comprises a proportion of phenolic resin of 25.9%±2% by mass, as well as a proportion of alumina fibers of 14.8%±2% by mass. After heat testing, the material also has a uniform crust and comprises no cracks.

Figure 3:
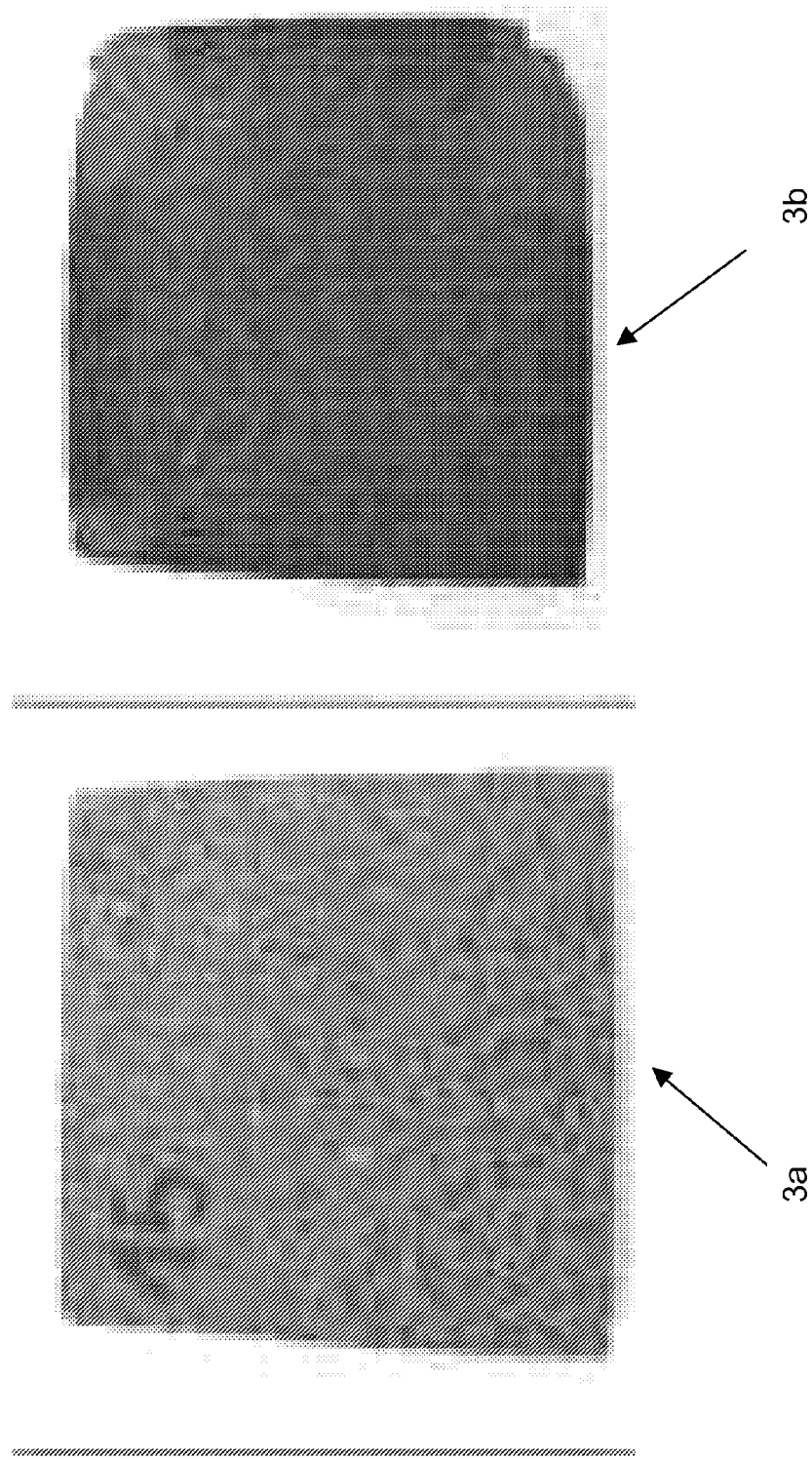
in FIG. 3: a third material of the disclosed embodiment before and after heat testing.

FIG. 3 shows a third material 3a, 3b of the disclosed embodiment. This material comprises epoxy resin in a proportion of 27%±2% by mass, as well as a proportion of carbon fibers of 14.8%±2% by mass. After heat testing 3b, this material also has a uniform crust with no cracks.

Figure 4:
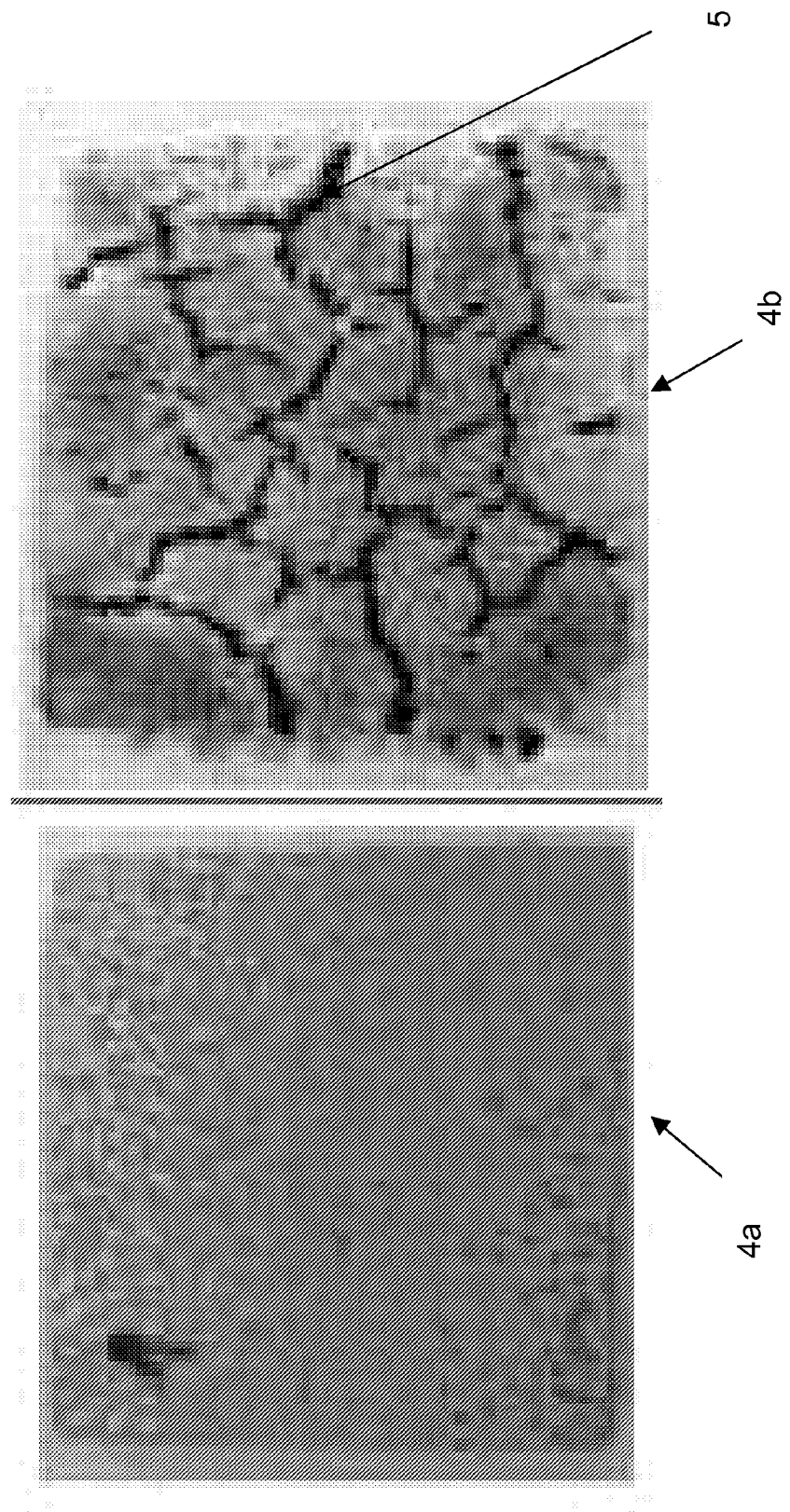
in FIGS. 4 and 5: a material with a silicone binding agent, with and without fibers respectively, before and after heat testing.

FIG. 4 shows a material 4a, 4b with a 24.2% proportion by mass of silicone resin binding agent and a 14.8% proportion by mass aerogel load without fibers, before 4a and after 4b heat testing. After the test, the sample has large cracks 5 that make it unusable as a high flow heat insulator.

Figure 5:
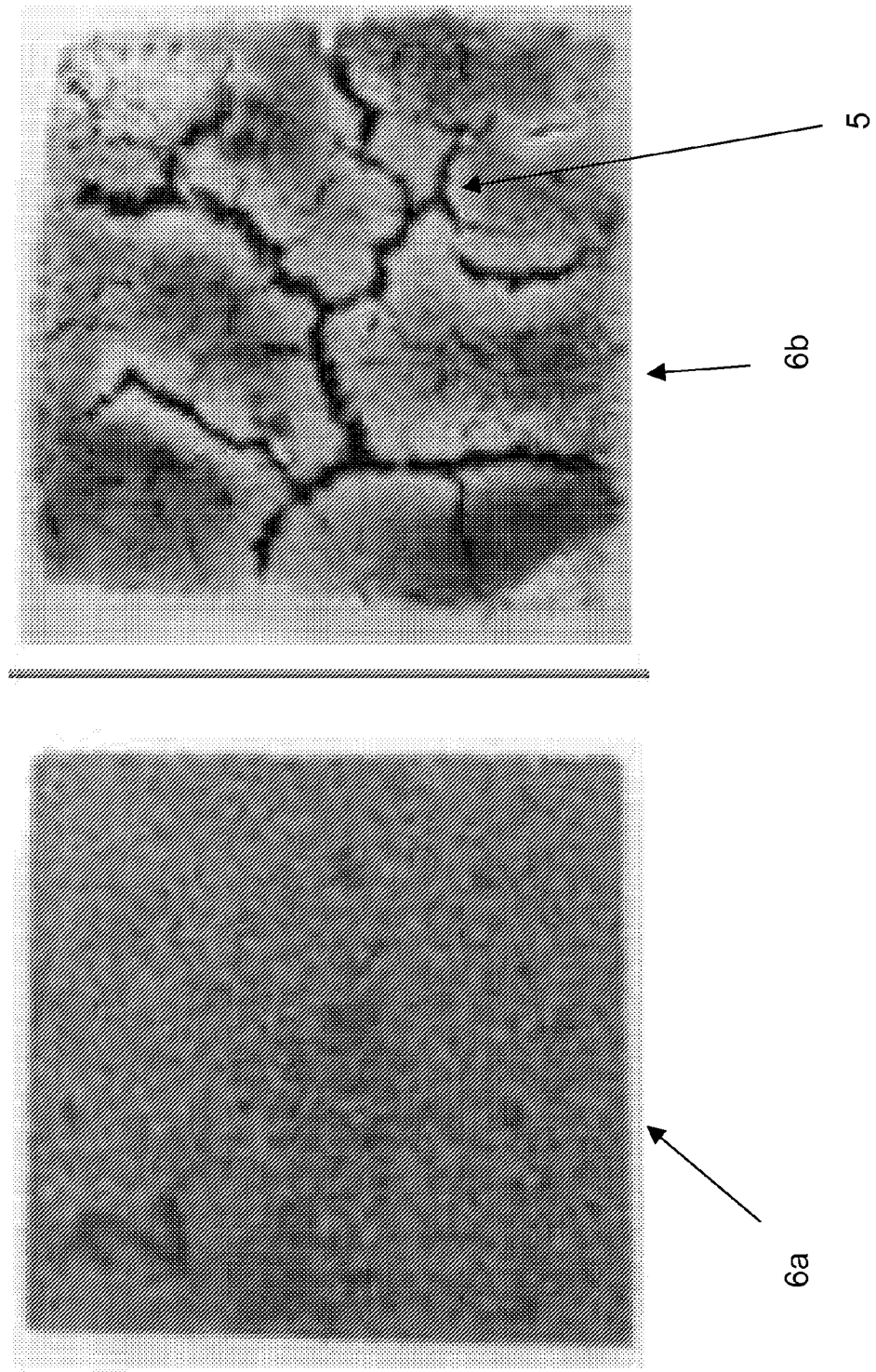

FIG. 5 shows a material 5a, 5b with a 24.2% proportion by mass of silicone resin binding agent and a 14.8% proportion by mass of carbon fibers, before 6a and after 6b heat testing. Here also, large cracks 5 appear and the material is unusable as a large flow heat insulator.

Figure 6:
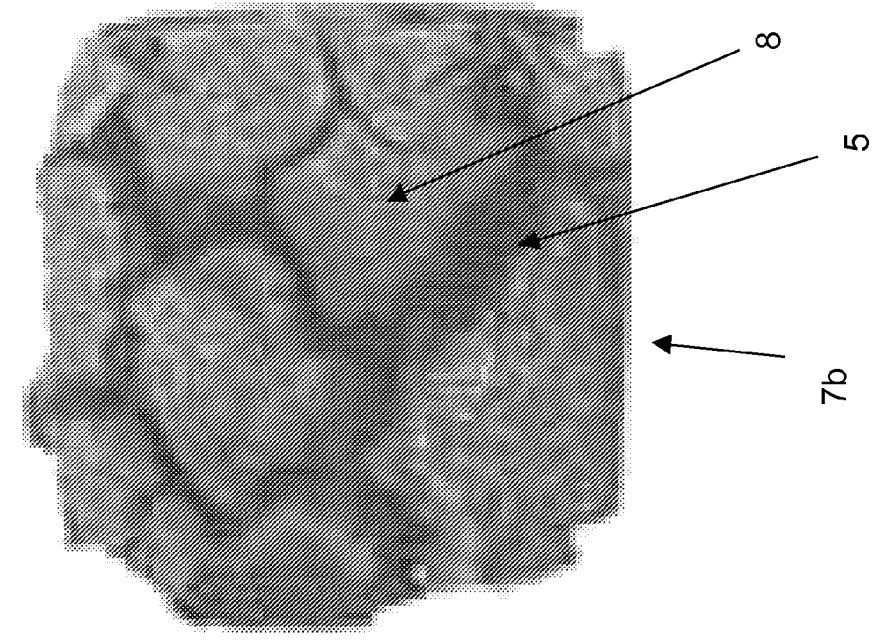
in FIG. 6: a material of the prior art without fibers before and after heat testing.
Figure 6:
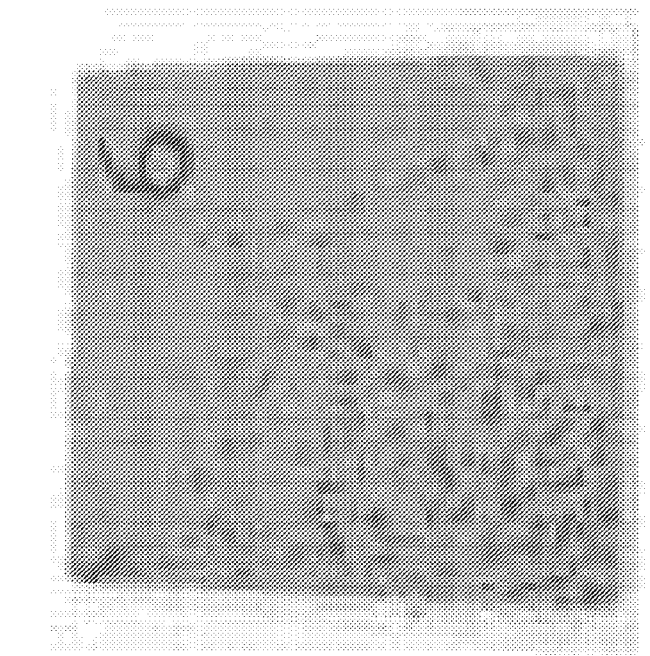

FIG. 6 shows the NORCOAT material 7a, 7b of the prior art, without added fibers. After heat testing 7b, this material shows blistering 8 and large cracks 5; consequently, it is only possible to use it when very thick, which is incompatible with optimizing the mass of insulating material and with good aerodynamics for the vehicle comprising it.

Figure 7:
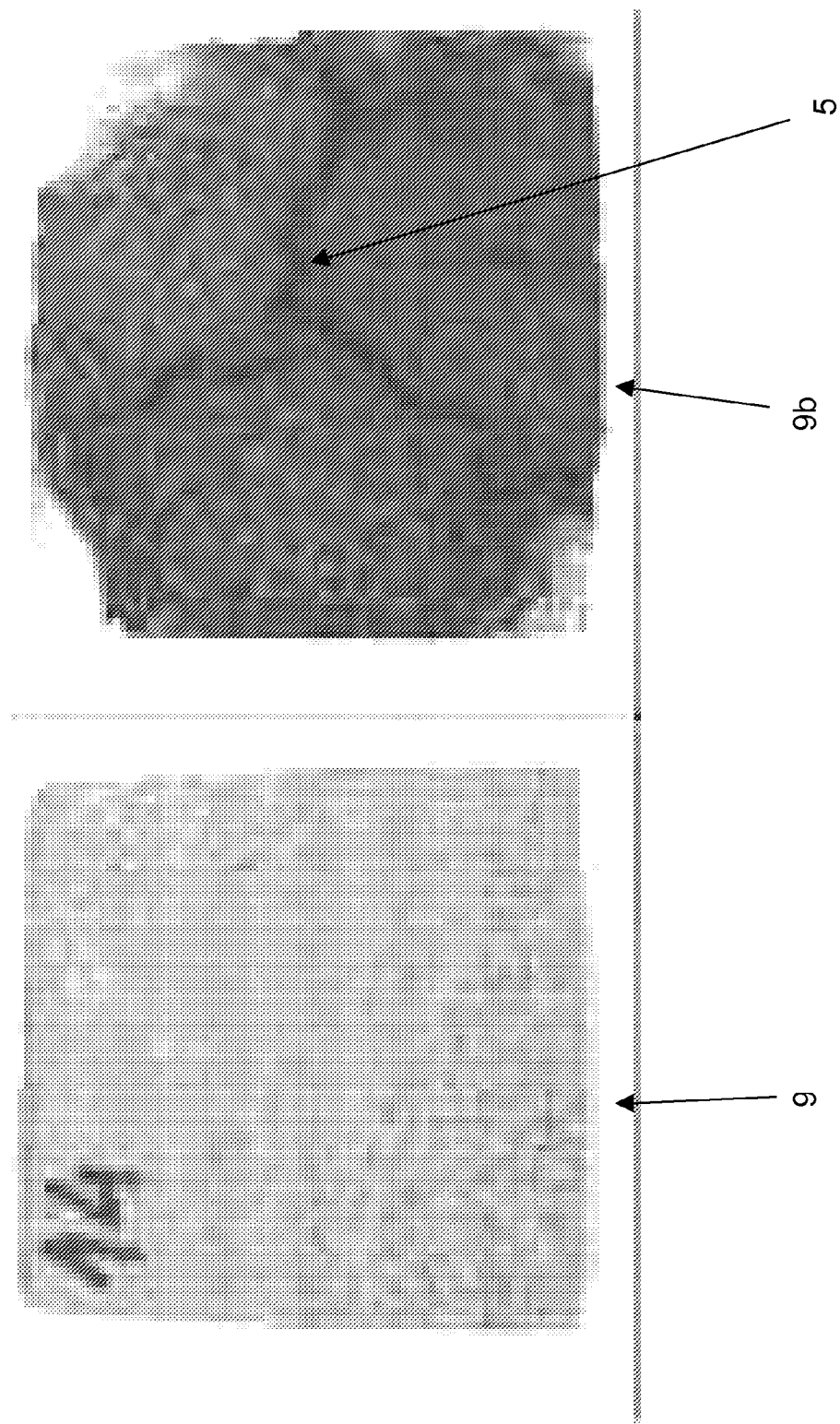
in FIG. 7: a material with an epoxy binding agent without fibers before and after testing.

To better emphasize the improvement in the material's resilience brought about by the fibers, a test was performed with cork (having a cork granule size of 0.5 mm to 1.0 mm) comprising the epoxy resin binding agent of FIG. 3, without fibers. FIG. 7 represents this material before 9a and after 9b testing. A large crack 5 can be seen in the after-test photo, which form a three-pointed star with its center located approximately at the center of the sample.

The short carbon or alumina fibers increase the cohesion of the material into which they are incorporated and increase the resilience of this material when subjected to an intense heat flow.

Examining the results makes it possible to conclude that the presence of fibers in general, whether carbon or alumina fibers, causes most of the cracks to disappear from the crust.

The best result is achieved with phenolic and epoxy matrices, whether carbon fibers or alumina fibers are used.

However, cracks remain with a silicone matrix.

It follows that fibers, such as carbon or alumina fibers, make it possible to better preserve the state of the surface when using cork-based heat protection materials with a density of between 0.2 and 0.45.

Within the framework of the disclosed embodiment, the materials with the best results comprise a phenolic or epoxy resin-based binding agent.

The heat protection material is made of a mixture comprising cork granules and resin as a binding agent, which also comprises short fibers of heat-resistant material.

The proportion of short fibers in the material is 12 to 18% by mass and preferably, the proportion of short fibers corresponds to a percentage by mass of 14.5 to 15.5%.

In the case in which the resin is phenolic resin, the percentage of resin by mass is between 20 and 30% and preferably 25.9%±2%.

In the case in which the resin is epoxy resin, the percentage of resin by mass in the mixture is between 20 and 35% and preferably 27%±2%.

The chosen epoxy resin is a resin with two ingredients.

The short fibers are carbon fibers or possibly alumina fibers.

Over and beyond the initial application of providing heat protection for space vehicles, the disclosed embodiment can find numerous other applications as heat protection in the fields of rail, sea, air and ground transportation, in the field of industry, such as machinery, in the field of construction, such as fire-retardant protection.

The invention claimed is:

1. A heat protection material composition that encrusts for protecting a surface from heat, comprising:
   cork granules, carbon or alumina fibers and resin, the resin being a binding agent of the heat protection material composition and the heat protection material being designed so that the heat protection material composition has an ablative crust formed when exposed to a heat flow, wherein the heat protection material composition in total comprises 20 to 35% of the resin chosen between epoxy or phenolic resin by mass relative to the heat protection material composition as a whole, 12 to 18% of the carbon or alumina fibers by mass relative to the heat protection material composition as a whole and wherein the 20 to 35% by mass of the resin and the 12 to 18% by mass of said carbon or alumina fibers provide for the remainder of the heat protection material composition to be 47 to 68% cork granules by mass relative to the heat protection material composition as a whole.

2. The heat protection material composition that encrusts according to claim 1, wherein the percentage of the carbon or alumina fibers is between 14.5 to 15.5% by mass relative to the heat protection material composition as a whole.

3. The heat protection material composition that encrusts according to claim 1, wherein the resin is phenolic resin.

4. The heat protection material composition that encrusts according to claim 3, wherein the percentage of the phenolic resin is between 20 and 30% by mass relative to the heat protection material composition as a whole.

5. The heat protection material composition that encrusts according to claim 4, wherein the percentage of the phenolic resin is 25.9%±2% by mass relative to the heat protection material composition as a whole.

6. The heat protection material composition that encrusts according to claim 1, wherein the resin is epoxy resin.

7. The heat protection material composition that encrusts according to claim 6, wherein the percentage of the epoxy resin is between 20 and 35% by mass relative to the heat protection material composition as a whole.

8. The heat protection material composition that encrusts according to claim 7, wherein the percentage of the epoxy resin is 27%±2% by mass relative to the heat protection material composition as a whole.

9. The heat protection material composition that encrusts according to claim 6, wherein the epoxy resin is a resin with two ingredients.

10. The heat protection material composition that encrusts according to claim 1, wherein the fibers are carbon fibers.

11. The protection material composition that encrusts according to claim 1, wherein the fibers are alumina fibers.

* * * * *